Nov. 5, 1957    K. H. BARNEY    2,812,450
PULSE TIMING SYSTEMS
Filed April 29, 1955    4 Sheets-Sheet 1

INVENTOR
KAY HOWARD BARNEY
BY
ATTORNEY

Nov. 5, 1957 K. H. BARNEY 2,812,450
PULSE TIMING SYSTEMS
Filed April 29, 1955 4 Sheets-Sheet 2

INVENTOR
KAY HOWARD BARNEY
BY
ATTORNEY

Nov. 5, 1957     K. H. BARNEY     2,812,450
PULSE TIMING SYSTEMS
Filed April 29, 1955     4 Sheets-Sheet 3

INVENTOR
KAY HOWARD BARNEY
BY
ATTORNEY

Nov. 5, 1957 K. H. BARNEY 2,812,450
PULSE TIMING SYSTEMS
Filed April 29, 1955 4 Sheets-Sheet 4

INVENTOR
KAY HOWARD BARNEY
BY
ATTORNEY

United States Patent Office 2,812,450
Patented Nov. 5, 1957

2,812,450

PULSE TIMING SYSTEMS

Kay Howard Barney, Roslyn Heights, N. Y., assignor to Sperry Rand Corporation, a corporation of Delaware Application April 29, 1955, Serial No. 504,710

15 Claims. (Cl. 307—88)

The present invention relates to electronic pulse timing systems. It is particularly concerned with low impedance timing circuits of a kind employing ferro-type storage devices of the ferromagnetic reactor or ferroelectric capacitor type, for example.

In radar and other types of electronic circuits, it is often desirable to provide a timing system for generating a D.-C. output voltage of a certain magnitude and time duration in response to an input trigger pulse. It may be further desirable that the timing system be automatically resettable by a further trigger pulse received before termination of the aforementioned D.-C. output voltage so as to maintain said output voltage for a further period of time from the moment the further trigger pulse was received. Thus, a D.-C. output voltage of desired magnitude should be generated and maintained from a first trigger pulse of a series of pulses recurring at a regular or random rate faster than an effective delay time for the system before being terminated at the end of an approximate lapse of time of desired extent after the last trigger pulse of such a series is received.

Circuits are generally known in the art for performing such a function, but, are of the high impedance type employing resistor-capacitor timing components. High impedance circuits are sometimes disadvantageous and not as reliable as low impedance circuits for use in the field, especially under conditions of extreme humidity. Although a resistor-capacitor combination can be chosen so as to have a relatively low impedance by decreasing the value of the resistor, the size of the capacitor must be increased for maintaining the same time constant. Where long time constants from several to thirty or more seconds are desired, an enormous capacitor would be required for a low impedance resistor-capacitor circuit.

Therefore, it is an object of the present invention to provide an improved timing circuit utilizing ferro-type devices such as saturable ferromagnetic reactors or polarizable ferro-electric capacitors for providing a predetermined D.-C. output voltage of desired duration and magnitude upon receipt of an input trigger pulse.

It is a further object to provide a timing circuit as aforedescribed for providing a D.-C. output voltage of certain duration and magnitude in response to an input trigger pulse, the system being adapted to be recycled by any following input pulse recurring before the D.-C. output voltage is terminated so as to maintain said output voltage for a period which extends for a desired length of time after the last received of such input trigger pulses.

It is a further object of the present invention to provide a low impedance timing circuit as aforedescribed having an effective time constant of short or extremely long duration.

It is yet another object of the present invention to provide a system as aforedescribed for generating a D.-C. output voltage of substantially constant duration in response to an input trigger pulse received at substantially any time during operation of the system.

The foregoing and other objects of the present invention are attained by providing a bistable circuit in combination with timing apparatus comprising a plurality of tandemly connected ferro-type storage devices such as saturable ferromagnetic cores or polarizable ferroelectric capacitors, for example. A first input trigger pulse drives the bistable circuit into one of its stable operating states, the timing apparatus being responsive to said first input trigger pulse for providing a delayed output after storage, transfer and storage of electrical energy from one to the next storage device for driving said bistable circuit into the other of its stable operating states at a desired time delay after the trigger pulse. Means are provided with the system as described in more detail below for recycling the timing apparatus in response to a further trigger pulse received before the aforementioned delayed output is provided so as to provide a further delay before the bistable circuit is driven into its other operating state.

Referring to the drawings.

Figure 1:
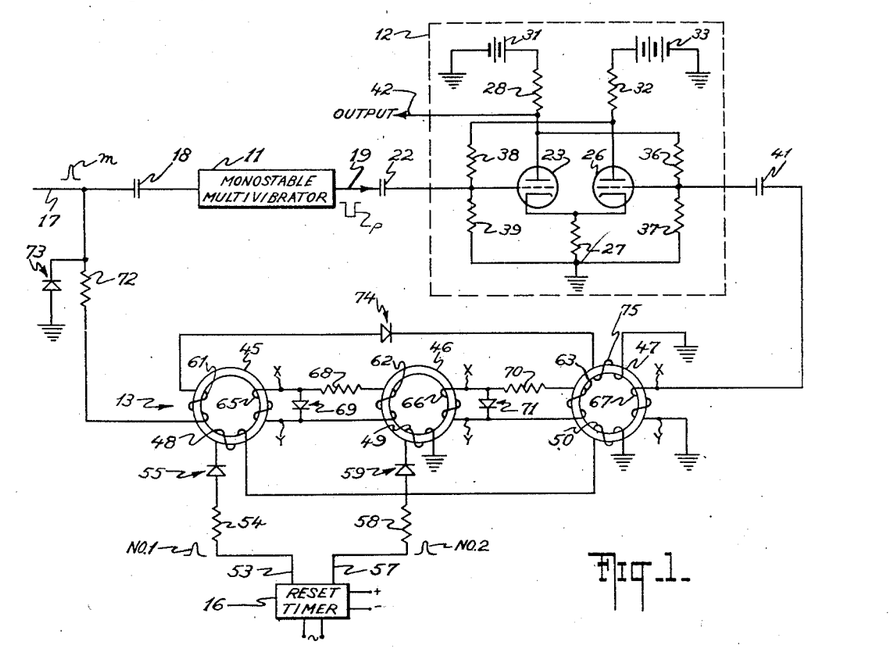
Fig. 1 is a schematic diagram of a first embodiment of the present invention utilizing ferromagnetic storage devices.

Referring now to Fig. 1, a first embodiment of the present invention comprises a monostable multivibrator 11, a bistable circuit 12 and timing apparatus 13. The timing apparatus 13 includes a reset timer 16 similar to the apparatus shown in Fig. 2, for example, which apparatus will be described in detail further below.

The monostable multivibrator 11 comprises any conventional multivibrator circuit known in the art having one stable and one quasi-stable operating state requiring a positive video trigger pulse designated by "m" in Fig. 1, for example, to perform a complete cycle. If a positive trigger pulse is applied to multivibrator 11 via input lead 17 and coupling capacitor 18, multivibrator 11 is driven into a quasi-stable state whereby a negative pulse such as "p" is provided at the output lead 19 for the time duration of the quasi-stable state of multivibrator 11 as determined by the timing circuit thereof. The output at lead 19 is applied through a capacitor 22 to a first input for the bistable circuit 12.

The bistable circuit 12 may comprise an Eccles-Jordan type of multivibrator, for example, having two different stable states of operation. It includes triode vacuum tubes 23 and 26 having a common cathode resistor 27 with one end coupled to the cathodes of tubes 23 and 26 and the other end grounded. The plate of tube 23 is connected to one end of a plate load resistor 28 whose other end is connected to the positive terminal of a battery 31. A further plate load resistor 32 of the same resistance as resistor 28 has one of its ends connected to the plate of tube 26 and the other of its ends connected to the positive terminal of a battery 33 larger than battery 31.

The plate of tube 23 is connected to the grid of tube 26 by means of a resistor 36, a resistor 37 being provided between this grid and ground. A resistor 38 is connected between the plate of tube 26 and the grid of tube 23, a further resistor 39 being connected between this grid and ground. Resistors 36 and 38 may have equal resistance values as may resistors 37 and 39.

The input coupling capacitor 22 is coupled to the grid of tube 23 at the junction between resistors 38 and 39. A further input coupling capacitor 41 is coupled to the grid of tube 26 at the junction between resistors 36 and 37. An output lead 42 is connected to the plate of tube 23 for obtaining a D.-C. output voltage therefrom. The potential provided by battery 33 is slightly larger than the potential provided by the battery 31 so that when the bistable multivibrator circuit 12 is first turned on before receiving any trigger pulses, the grid of tube 23 will be at a slightly higher potential than the grid of tube 26. Thus, for initial operation of circuit 12 before any input trigger pulses are applied thereto, tube 23 will normally be conductive while tube 26 will be held cut off by virtue of the current flow through the cathode resistor 27 and a suitable negative bias developed from grid to the cathode of tube 26.

The timing apparatus 13 comprises first, second and third ring-shaped saturable magnetic cores 45–47 of similar size, shape and ferromagnetic material having substantially similar hysteresis characteristics. Each of cores 45–47 is of a type having a rectangular hysteresis loop or B–H characteristic as described in the article on pages 475–478 of the Proceedings of the I. R. E., April 1952, vol. 40, No. 4. A sufficient magnetizing force in one direction produced by a pulse of current through an input winding about such a core drives the core into one state of magnetic saturation which will not change until a sufficient magnetizing force in an opposite direction is provided for driving the core into a second and opposite state of magnetic saturation. Such a core has a property that it remains in a magnetically saturated state after termination of a magnetizing force for an indefinite period of time.

The cores 45–47 are provided with first similar input windings 48–50 insulatedly wound in the same direction about each core as is schematically illustrated in Fig. 1 so that current flowing from a left end to a right end of either of these windings produces magnetic lines of force for magnetizing a core in a counterclockwise direction, for example. The right-hand ends of windings 49 and 50 are grounded, the right-hand end of winding 48 being connected to the left-hand end of winding 50 so that windings 48 and 50 are in series with each other.

Figure 1A:
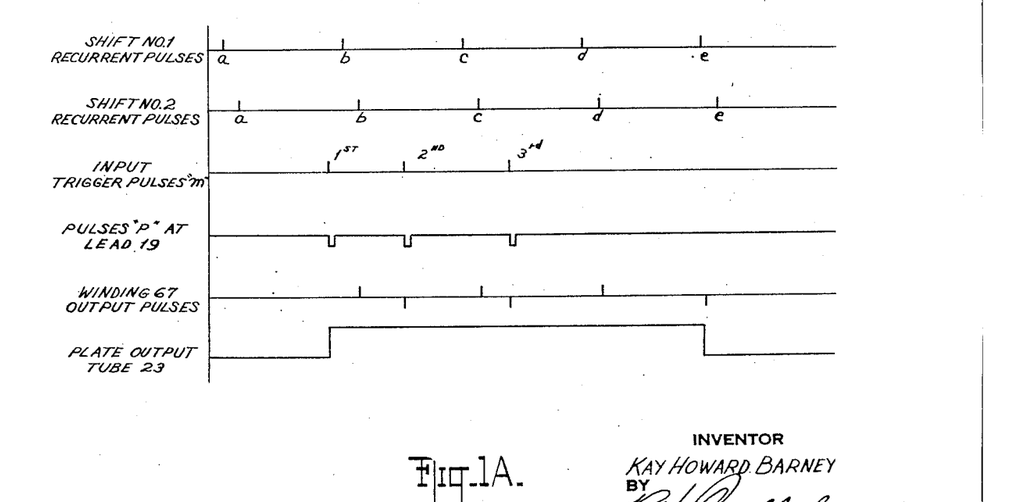
Fig. 1A is a plot of various voltage waveforms versus time for the system of Fig. 1.

The reset timer 16 is provided with a first output lead 53 connected through a current-limiting resistor 54 and a rectifier 55 to the left-hand end of winding 48 so as to supply windings 48 and 50 with a first series of positive shift No. 1 recurrent pulses having a predetermined repetition rate as illustrated in Fig. 1A. Whenever the arrowhead side of rectifier 55 is driven positive with respect to the other side thereof by such a pulse, sufficient current should flow through windings 48 and 50 from left to right so as to drive each of cores 45 and 47 into magnetic saturation in a counterclockwise direction, for example. It should be understood that the direction of the arrowhead for the schematically illustrated rectifier 55 and for any other rectifier schematically illustrated in the drawings indicates the direction of conventional current flow (from positive to negative) rather than the direction of the flow of electrons (negative to positive).

Reset timer 16 is also provided with a second output lead 57 connected through a current-limiting resistor 58 and a rectifier 59 to the left-hand end of input winding 49 about core 46 so as to supply winding 49 with a second series of positive shift No. 2 recurrent pulses of the same repetition rate as the shift No. 1 pulses. A current pulse flowing through the winding 49 as a result of a shift No. 2 pulse should also be sufficient for driving core 46 into magnetic saturation in a counterclockwise direction, for example. The shift No. 2 pulses are delayed in time somewhat from the shift No. 1 pulses as is illustrated in Fig. 1A so that there is sufficient time before a shift No. 2 pulse for core 46 to be driven into magnetic saturation from a counterclockwise to a clockwise direction by a magnetizing force applied to core 46 at the time of a shift No. 1 pulse.

Second similar input windings 61–63 are also wound in insulated relationship about cores 45—47, respectively, as is shown in Fig. 1. These windings are wound in the directions schematically illustrated so that current flow from an illustrated lower to an upper end of each of windings 61—63 would cause each of cores 45—47, respectively, to become magnetized in a clockwise direction.

Similar output windings 65—67 are also provided in insulated relationship about cores 45—47, respectively, being wound in similar directions as schematically illustrated in Fig. 1 so that a change in magnetic saturation to a counter-clockwise direction in a core will cause a negative pulse to be provided across an output winding from terminal X to a terminal Y therefor. A change in magnetic saturation to a clockwise direction in a core will cause a positive pulse to be provided across the output winding thereof.

The output terminal X of winding 65 about core 45 is connected through a resistor 68 to the upper end of input winding 62 about core 46, the lower end of winding 62 being coupled to the output terminal Y of winding 65. A rectifier 69 is connected across terminals X and Y of winding 65 for short-circuiting these terminals when the terminal X side of rectifier 69 is more positive than the other side thereof, resistor 68 and rectifier 69 comprising an intercore network. Similarly, the output terminals X and Y of winding 66 about core 46 are coupled to the input terminals of winding 63 about core 47 by means of an intercore network comprising series resistor 70 and a shunt rectifier 71 connected in the same manner as rectifier 69. The input winding 61 for core 45 has its illustrated lower end coupled to the trigger input lead 17 by a resistor 72 whose end nearest the lead 17 is connected to ground through a rectifier 73 for passing current only when the upper end of rectifier 73 is at a negative potential with respect to a grounded lower end thereof. The upper end of winding 61 is coupled through a rectifier 74 to one end of a further winding 75 in insulated relationship about the core 47, the other end of winding 75 being grounded. Rectifier 74 is adapted to pass current from left to right to winding 75 as illustrated in Fig. 1, winding 75 being disposed about core 47 so that current flow from left to right therethrough provides a magnetizing force for counter-clockwise magnetization of core 47, for example.

Figures 2, 3:
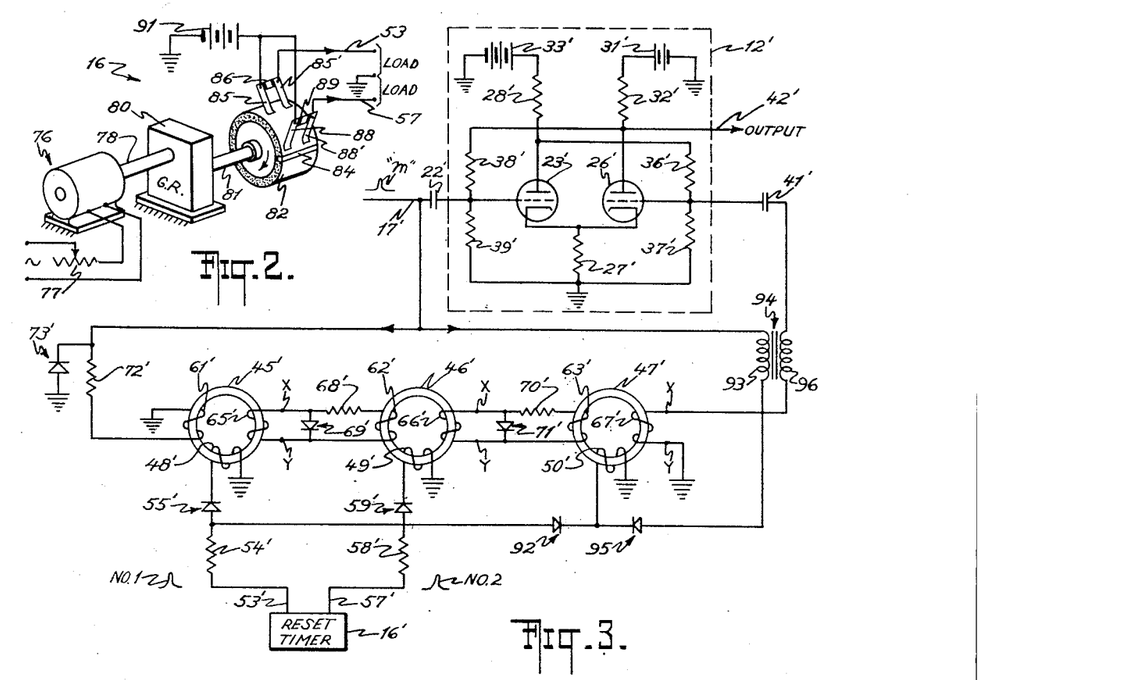
Fig. 2 is a view of apparatus which may be employed as a reset timer for providing shift pulses for various embodiments of the present invention.
Fig. 3 is a schematic diagram of a further embodiment of the present invention.

The reset timer 16 of the system of Fig. 1 may comprise any apparatus for providing a first series of recurrent shift No. 1 driver pulses and a second series of recurrent shift No. 2 driver pulses of the same repetition rate which are delayed in time somewhat from the shift No. 1 pulses. This apparatus may comprise, for example, a constant speed motor 76 as illustrated in Fig. 2 whose speed may be changed by adjustment of rheostat 77. An output shaft 78 for motor 76 is coupled to gear reduction apparatus 80 for rotation of a further shaft 81 at a considerably reduced rate compared to the rate of rotation of the shaft 78.

A dielectric cylinder 82 is attached to the shaft 81 for clockwise rotation thereby, for example, the cylinder 82 being provided with a metallic commutator strip 84 across an annular side of cylinder 82. A fixed pair of brushes comprising metallic strip arms 85 and 85′ are provided adjacent the cylinder 82 so that one pair of resilient bent ends thereof is in close relationship with the cylinder so as to contact the commutator strip 84 when adjacent therewith. The other pair of ends of strip arms 85 and 85' are insulated from each other by a dielectric spacer element 86.

A further fixed pair of brushes comprising metallic strip arms 88 and 88' are provided with one pair of resilient bent ends thereof in close relationship with the cylinder 82 for contact with commutator strip 84 shortly after the strip 84 is rotated past the strip arms 85—85'. The other pair of ends of the strip arms 88 and 88' are insulated from each other by a dielectric spacer element 89.

The strip arms 85 and 88 are connected in parallel with the positive terminal of a battery 91 as is illustrated in Fig. 2. The output leads 53 and 57 of the reset timer device 16 are connected to the strip arms 85' and 88', respectively. Thus, a pulse of current is supplied through lead 53 to the shift pulse windings 48 and 50 shown in Fig. 1 every time the commutator strip 84 short circuits the ends of the strip arms 85 and 85'. Likewise, when the commutator strip 84 short circuits the ends of strip arms 88 and 88', a pulse of current will be provided through lead 57 to the shift pulse winding 49 of core 46. The aforementioned current pulses are limited by resistors 54 and 58 in Fig. 1, but, should be of sufficient magnitude so that a pulse is sufficient for providing a magnetizing force about a shift pulse input winding for saturably magnetizing the core upon which such a winding is included.

By proper choice of factors determining the speed of rotation of the cylinder 82, the size of the cylinder and the spacing of the resilient contact ends of arms 85—85' and 88—88' therearound, any desired repetition rate and timing relationship between the shift No. 1 recurrent pulses and the shift No. 2 recurrent pulses may be provided. It is readily apparent that the repetition rate for the shift No. 1 and shift No. 2 pulses provided by apparatus as shown in Fig. 2 may be adapted to be up to 30 seconds or longer, for example, without requiring long time constant R-C circuits or high impedances.

In the operation of the system of Fig. 1, it is helpful to think of each of the magnetic cores 45—47 as a bistable device which produces an output pulse only when its state of magnetic saturation is changed from clockwise to counterclockwise or vice versa by a pulse of current through a winding thereof. For the purposes of the following discussion a core will be said to be in its active state when it is magnetically saturated in a clockwise direction and in an inactive state when it is magnetically saturated in a counterclockwise direction.

Initially, each of cores 45—47 is magnetically saturated in a counterclockwise direction due to the application of the shift No. 1 and shift No. 2 pulses thereto as shown in Fig. 1A. Before any trigger pulses "m" are received at input lead 17 for the system of Fig. 1, the tube 23 of the bistable circuit 12 is conducting heavily and the tube 26 is cut off as has been discussed above. Since the cores 45 through 47 are initially all magnetized in the same direction, successive shift pulses do not produce pulses in any of the signal output windings 65—67 for the cores.

A first positive video input trigger pulse "m," for example, at the input lead 17 triggers the monostable multivibrator 11 to produce a negative output pulse "p" upon the lead 19 during the quasi-stable state of multivibrator 11. This negative pulse is applied to the grid of tube 23 causing it to be cut off and the tube 26 to become heavily conductive as a result of typical multivibrator action. Thus, the plate voltage of tube 23 rises to that of the battery 31 so that an increased D.-C. output is provided on lead 42 at the time of reception of the first input trigger pulse "m." This is illustrated in Fig. 1A.

The application of the first input trigger pulse "m" to the signal input winding 61 of the core 45 causes the magnetization of this core to change to a clockwise direction because of the resultant pulse of current through winding 61. The voltage pulse induced across the output winding 65 of core 45 at this time is positive from terminal X to terminal Y of winding 65, and is blocked by the rectifier 69 so that there is no change in magnetizaton of the core 46. The pulse of current which flows from winding 61 through rectifier 74 and winding 75 of core 47 in response to the positive input trigger pulse "m" does not change the direction of magnetization of the core 47 because the direction of any magnetization provided by the current flow therethrough is the same as the initial direction of core 47, i. e., is counterclockwise. Core 45 is now considered to be in its active state whereas cores 46 and 47 are still in their inactive states.

Assuming that no further input trigger pulse "m" is received by the system, the shift No. 1b pulse as shown in Fig. 1A after the first trigger pulse "m" returns the core 45 to its inactive state whereby a voltage pulse is induced across the winding 65 which is negative from terminal X to terminal Y. The aforementioned negative voltage pulse is transmitted via intercore network 68—69 to the input winding 62 of the core 46, thus changing the magnetization of core 46 to its active state. The positive output voltage pulse induced across the signal output winding 66 is blocked by the rectifier 71 so that the magnetization of the core 47 still remains unchanged. At this time cores 45 and 47 are in their inactive states whereas core 46 is in its active state.

The following shift No. 2b pulse returns core 46 to its inactive state so that a voltage pulse is induced across the output winding 66 which is negative from terminal X to terminal Y thereof and transmitted via the intercore network 70—71 to the input winding 63 of core 47 for changing the magnetization of this core to clockwise for an active state of magnetic saturation. The positive output voltage pulse induced across output winding 67 of core 47 at this time does not affect the operation of the bistable circuit 12 as tube 26 is still conducting and a positive pulse supplied to the grid thereof will have no effect thereon. At this time the cores 45 and 46 are in an inactive state and core 47 is in an active state.

Ordinarily, if no further input trigger pulse "m" were received the following shift No. 1c pulse applied to the winding 50 of core 47 would cause the core 47 to change to an inactive state for inducing a negative voltage pulse across the output winding 67 from terminal X to terminal Y thereof. Such a voltage would trigger the bistable multivibrator circuit 12 causing tube 26 to be cut off and tube 23 to become conductive.

However, suppose a second input trigger pulse "m" is received after the shift No. 2b pulse and before the shift No. 1c pulse as is illustrated in Fig. 1A. The magnetization of the core 45 is changed to an active state by virtue of the current pulse through its input winding 61 and the magnetization of the core 47 is changed to its inactive state by virtue of the current pulse through its input winding 75. At this time a negative voltage pulse is induced across the output winding 67 of the core 47, and supplied by way of capacitor 41 to the grid of tube 26. Ordinarily, such a pulse would cause the operation of the bistable circuit 12 to change so that tube 26 would be cut off and tube 23 would become conducting. However, if the timing of multivibrator 11 is properly chosen, the negative output pulse "p" provided at the output lead 19 thereof can be made sufficiently wider than the aforementioned negative trigger pulse applied to the grid of the tube 26 so that tube 23 is held cut off and the operation of the bistable circuit 12 remains unchanged. At this time the core 45 is in an active state and cores 46 and 47 are in inactive states of magnetization just as they were at the time of the first input trigger pulse "m."

It is readily seen that the next shift No. 1c pulse will cause core 45 to be driven into its inactive state so as to provide a negative output pulse between terminals X and Y of winding 65 for driving core 46 into an active state. When the next shift No. 2c pulse is received the core 46 is changed back to its inactive state thereby causing core 47 to change to its active state. Again, a further video input trigger pulse received after shift No. 2c pulse causes the magnetization of the cores 45—47 to assume the same directions that were present at the time of receipt of either the first or the second trigger pulses "m." A further shift No. 1d pulse results in core 45 assuming an inactive state whereas core 46 attains an active state. The following shift No. 2d pulse causes the core 46 to assume an inactive state whereby core 47 attains an active state. The next shift No. 1e pulse causes the core 47 to be magnetized in a counterclockwise direction so that this core is again changed to its inactive state, whereby a negative output pulse is applied through capacitor 41 to the grid of tube 26 for turning this tube off. Multivibrator action of circuit 12 causes tube 23 to become conductive whereby the D.-C. output voltage provided at the plate of tube 23 is reduced as is shown in Fig. 1A.

In general, it can be seen that the tube 23 of the bistable circuit 12 will remain cut off and tube 26 conductive after a positive trigger pulse "m" until the active state of core 45 produced by the resultant current pulse through input winding 61 at this time has been passed from core 45 through core 46 to core 47 and a negative trigger pulse is generated at the output winding 67 of core 47 upon the application of a shift No. 1 pulse to the input winding 50 of core 47 when this core is in an active state. Video input trigger pulses arriving at such a time as to prematurely change core 47 back to an inactive state before the application of a shift No. 1 pulse will recycle the timing of the cores 45—47 so as to extend the time the tube 23 of the bistable circuit 12 is non-conducting.

A video trigger pulse between a shift No. 1 pulse and a shift No. 2 pulse will have no effect on the operation of the system. Therefore, it is desirable that there only be a slight time delay between the recurrent shift No. 1 pulses and the recurrent shift No. 2 pulses.

A somewhat different system in accordance with the present invention for performing the same function as the system of Fig. 1 is illustrated in Fig. 3. Reference numerals in Fig. 3 which are primed are utilized for components of this system which are similar in structure and function to the components of Fig. 1 designated by corresponding unprimed reference numerals. The differences between the systems of Fig. 1 and Fig. 3 will now be set forth.

In Fig. 3, the trigger input lead 17' is coupled directly by capacitor 22' to the input of the bistable circuit comprising multivibrator 12'. No monostable multivibrator 11 as is shown in Fig. 1 is required for the circuit of Fig. 3, positive video trigger pulses being applied directly to the multivibrator 12'. The multivibrator 12' is slightly different from that of Fig. 1 having the larger battery 33' coupled to the plate of tube 23' and, thus, the grid of tube 26'. The smaller battery 31' is coupled to the plate of tube 26' and, thus, the grid of tube 23'. Therefore, before any input trigger pulses "m" are received on lead 17', the tube 23' is cut off while the tube 26' is conducting. The output lead 42' in the system of Fig. 3 is coupled to the plate of tube 26' rather than to the plate of tube 23' as is the case for the system of Fig. 1.

The shift pulse input winding 48' for the magnetic core 45' in the system of Fig. 3 has its right-hand end grounded rather than connected to the shift pulse input winding 50' of core 47' as is the case in the system of Fig. 1. The ungrounded end of winding 50' is connected through a rectifier 92 to the junction between rectifier 55' and resistor 54' so that the shift No. 1 recurrent pulses are simultaneously applied to windings 48' and 50'. The shift No. 2 recurrent pulses are applied to the winding 49' of the core 46' exactly as in the system of Fig. 1.

The input winding 61' of the magnetic core 45' has its upper end grounded rather than connected to any further winding about core 47' as in Fig. 1, the other end of winding 61' being connected to the trigger input lead 17' just as in the system of Fig. 1. The input lead 17' is also connected to the left-hand end of the shift pulse input winding 50' about core 47' of Fig. 3 through a transformer winding 93 of a one to one iron core transformer 94 and a rectifier 95. Thus, when a positive trigger input pulse "m" is applied to the lead 17', a current pulse flows through the transformer winding 93, the rectifier 95 and the winding 50' for magnetizing the core 47' in a counterclockwise direction. Therefore, if core 47' is in an inactive state as a result of a shift pulse input from reset timer 16', application of a positive input trigger pulse to winding 50' thereof has no effect on the direction of magnetic saturation of core 47'.

The output winding 67' of the core 47' is coupled to the grid of tube 26' of the bistable multivibrator 12' by a further transformer winding 96 of transformer 94 connected between the terminal X of winding 67' and the coupling capacitor 41' for tube 26'. The winding 67' is wound in a direction opposite that of the winding 67 in Fig. 1 so that a change in the magnetic saturation of the core 47' to a counterclockwise direction will provide a positive pulse between terminal X and the grounded terminal Y of winding 67' in Fig. 3.

Figure 3A:
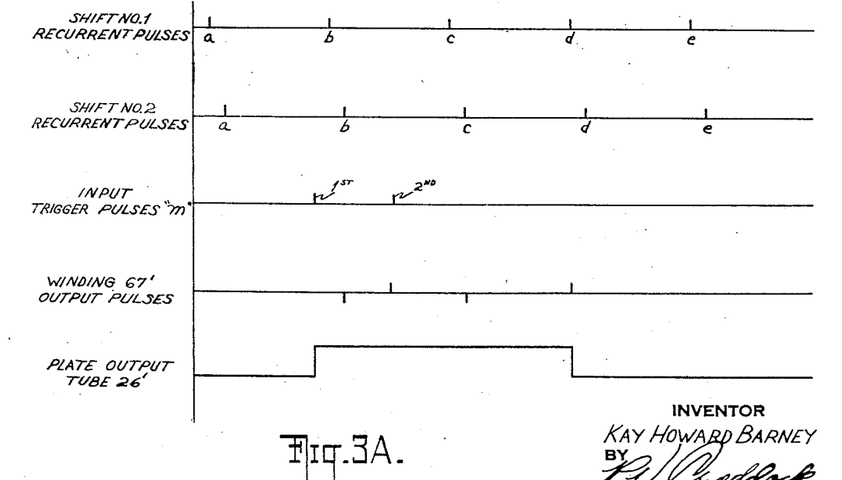
Fig. 3A is a plot of various voltage waveforms versus time provided in the system of Fig. 3.

The operation of the system of Fig. 3 may be best understood by considering this figure along with the plot of the various pulses in that system versus time as is shown in Fig. 3A. Before any trigger pulses are received, the shift No. 1 and shift No. 2 recurrent pulses cause each of cores 45'—47' to be magnetically saturated in a counterclockwise direction, the cores being considered as in inactive states of magnetization as before. At such a time the tube 26' of multivibrator 12' is conducting and tube 23' is cut off.

Upon receipt of a first positive input trigger pulse "m" as shown in Fig. 3, the tube 23' is caused to become conductive and tube 26' is caused to be cut off by virtue of the multi-vibrator action of the bistable circuit 12'. Since the trigger pulse "m" at the lead 17' is of positive polarity, a pulse of current is caused to flow in the input winding 61' of core 45' from the lower end of winding 61' to the upper end thereof and ground. This causes the core 45' to be magnetically saturated in a clockwise direction so that this core is now considered to be in an active state. The positive output pulse induced across output winding 65' as a result of the change in magnetization is blocked by rectifier 69' so that cores 46' and 47' remain in inactive states of magnetization.

The next shift No. 1b recurrent pulse after the first input trigger pulse "m" causes core 45' to become magnetically saturated in a counterclockwise direction. At this time a negative voltage pulse is induced across winding 65' from the terminal X and to terminal Y so that a pulse of current flows through the winding 62' of core 46' to magnetize the latter core in a clockwise direction. Immediately after the shift No. 1b recurrent pulse the cores 45' and 47' are in their inactive states while core 46' is in its active state.

The next shift No. 2b pulse applied to the winding 49' of core 46' causes this core to be remagnetized in a counterclockwise direction thereby inducing a negative voltage from terminal X to terminal Y of output winding 66' so that a pulse of current flows through the winding 63' of core 47' for driving core 47' into clockwise magnetic saturation. The induced negative voltage at the output winding 67' of core 47' at this time has no effect on the bistable circuit 12' since the tube 26' to which the negative voltage is applied is still non-conducting. Thus, cores 45' and 46' are in inactive states while core 47' is in an active state.

If a second positive trigger pulse "m" is received between a shift No. 2b pulse and a shift No. 1c pulse as indicated in Fig. 3A, the resultant current flow through the winding 50' of core 47 would cause the magnetic saturation of this core to change back to a counterclockwise direction and current flow through winding 61' would cause core 45' to be magnetically saturated in a clockwise direction. When core 47' is therefore, returned back to its inactive state by the second trigger pulse "m," a positive voltage is induced across winding 67' from terminal X to terminal Y which appears at the upper end of transformer winding 96. However, the voltage induced across the winding 96 of the transformer 94 by virtue of the positive input trigger pulse "m" supplied to the transformer winding 93 effectively cancels the aforementioned positive voltage provided at the upper end of transformer winding 96 as a result of the output from core winding 67' at the time of the second trigger pulse "m" so that there is no net voltage applied to the grid of tube 26' which would cause this tube to be conductive. Therefore, the D.-C. output provided on lead 42' of tube 26' remains at the level attained at the time of the first trigger pulse "m" and the magnetizations of the cores 45'—47' are recycled to what they were just after the first trigger pulse "m" was received.

The next shift No. 1c recurrent pulse operates to change core 45' back to its inactive state and the core 46' to its active state just as before. The next shift No. 2c pulse changes core 46' back to its inactive state and the core 47' to its active state. The following shift No. 1d pulse causes the third core 47' to be driven back into an inactive state whereby a positive voltage is induced across winding 67' from terminal X to terminal Y. This positive voltage is applied through the winding 96 to capacitor 41' and thence to the grid of tube 26' causing this tube to become conductive and the tube 23' to be cut off. Thus, the maximum plate voltage provided at the output 42' of tube 26' is terminated, the voltage decreasing to a normal value for tube 26' when this tube is conducting.

It is evident that the duration of the D.-C. output voltage or an effective time delay provided by the magnetic core arrangements shown in Fig. 1 or Fig. 3 after a signal input trigger pulse or after the last received pulse of a series of trigger pulses is equal to the time interval between such a pulse and the next received shift No. 1 pulse plus a fixed interval of time between two consecutive shift No. 1 pulses. In the aforedescribed systems the time interval from a trigger pulse "m" to the next shift No. 1 pulse could have been substantially equal to zero or substantially equal to the time interval between a shift No. 2 pulse and the next shift No. 1 pulse. Thus, the total effective time delay provided by the magnetic core arrangement of Fig. 1 or Fig. 3 is not necessarily constant and depends upon where between a shift No. 2 pulse and a following shift No. 1 pulse an input trigger pulse is received. A system for providing an effective time delay which is more nearly constant and of the same order of magnitude provided by the systems of Fig. 1 or Fig. 3 may be obtained by increasing the repetition rate of the shift pulses and increasing the number of magnetic core devices comprising the timing apparatus. Such an arrangement is shown in Fig. 4.

Figure 4:
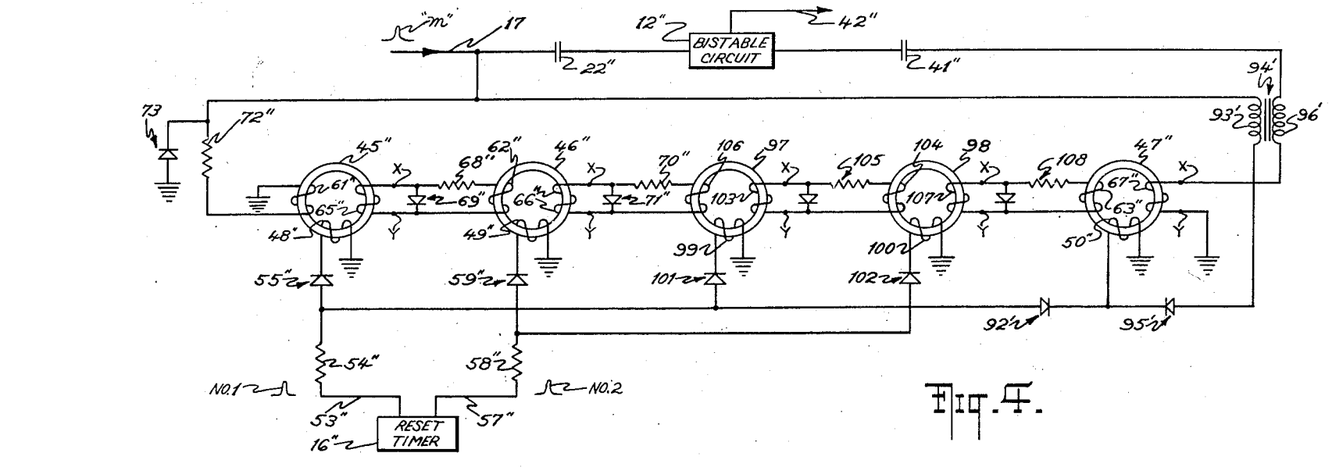
Fig. 4 is a schematic diagram of another embodiment of the present invention.

The system of Fig. 4 is substantially identical to that of Fig. 3, but includes two more saturable magnetic cores 97 and 98 between core 46" and core 47". The components of Fig. 4 represented by the primed and double primed reference numerals are substantially identical in structure and function with similar components of Fig. 3 referred to by corresponding unprimed and primed reference numerals. Thus, a detailed explanation of most of the parts of Fig. 3 is unnecessary.

The additional cores 97 and 98 include similar shift pulse input windings 99 and 100, respectively, wound in the same direction and having their right-hand ends grounded. The left-hand end of the winding 99 is coupled through a rectifier 101 to the junction between rectifier 55" and resistor 54" for receiving positive shift No. 1 pulses for magnetically saturating core 97 in a counterclockwise direction, for example. The left-hand end of winding 100 is coupled through a rectifier 102 to the junction between rectifier 59" and resistor 58" for receiving shift No. 2 recurrent pulses for magnetically saturating core 98 in a counterclockwise direction, for example. Thus, before any input trigger pulses are applied to the input lead 17" of the system of Fig. 4, all of the magnetic cores thereof are saturated in the same directions (counterclockwise), for example, and the cores are considered as being in their inactive states.

The core 97 of Fig. 4 is provided with an output winding 103 and the core 98 is provided with an input winding 104, both windings being connected together by a resistor-rectifier intercore network 105 of a type already described for coupling between an output and an input winding of adjacent cores in the previously described systems. The windings 103 and 104 are wound in the directions illustrated in Fig. 4 so that when the magnetization of core 97 is changed to counterclockwise, a negative voltage is induced across winding 103 between terminals X and Y thereof for causing a pulse of current to flow through winding 104 for magnetizing core 98 in a clockwise direction.

The core 97 is also provided with an input winding 106 coupled to intercore network 70"—71" for the output winding 66" of the core 46". This winding 106 is also wound so that when a negative voltage is induced in winding 66" from the terminal X to the terminal Y thereof, a pulse of current flows through winding 106 of core 97 for magnetically saturating core 97 in a clockwise direction.

The core 98 is also provided with an output winding 107 and a resistor-rectifier intercore network 108 similar to those already described. Whenever a voltage is induced across winding 107 which is negative from the terminal X to the terminal Y thereof, current flows through the input winding 63" of core 47" for magnetically saturating core 47" in a clockwise direction.

The operation of the Fig. 4 system is similar to that of the system shown in Fig. 3 except that the repetition rate for the shift pulses may be increased compared with that of the previous systems by speeding up the motor of reset timer 16". Before any input trigger pulses are received, each of the cores 45"—47", 97 and 98 is in an inactive state, having been magnetically saturated by the shift No. 1 or shift No. 2 pulses in a counterclockwise direction, for example just as in the systems of Figs. 1 and 3.

Figure 4A:
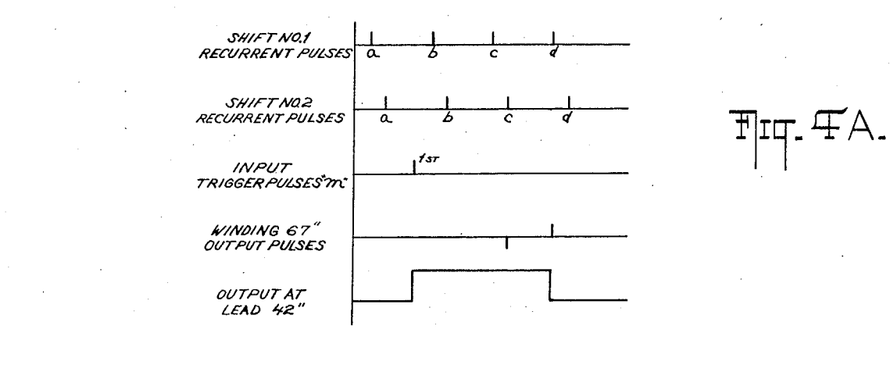
Fig. 4A is a plot of various voltage waveforms versus time provided in the system of Fig. 4.

A first positive input trigger pulse "m" at lead 17" for the system of Fig. 4 causes core 45" to assume a clockwise or active state of magnetic saturation just as in the aforedescribed systems. The next received shift No. 1b pulse as shown in Fig. 4A causes core 45" to be saturated in the opposite direction so that it again assumes an inactive state and provides a negative output across winding 65" for changing the magnetic saturation of core 46" to an active state. Right down the line of cores 45", 46", 97, 98 and 47", a change in the saturation of a previous core to an inactive state causes the next core to be magnetized into an active state, the next received shift pulse applied to an input winding of an active core causing it to be magnetically saturated in an inactive state. Thus, an active state for core 45" will be passed to core 46", to core 97, to core 98 and then to core 47". When the core 47" is changed back to an inactive state, a positive pulse is provided across its output winding 67" which is applied to the bistable circuit 12" for changing its operation from one stable state to another. Recycling means for the system of Fig. 4 in case a further trigger pulse is received includes the transformer 94' just as in the system of Fig. 3.

There may be three shift pulses for the Fig. 4 system occurring during the same time interval during which only two shift pulses occur for the systems of Figs. 1 and 3. Thus, if the two extra cores 97 and 98 and windings therefor are provided as shown in Fig. 4, the duration of the D.-C. output voltage provided upon lead 42″ will be equal to the time interval between a last received trigger pulse and the next received shift No. 1 pulse plus a fixed interval of time between alternate shift No. 1 pulses. Therefore, it should be evident that the duration of a D.-C. output voltage of desired extent from a last received trigger pulse occurring between a shift No. 2 pulse and the following shift No. 1 pulse for any trigger pulse series will be more constant for trigger pulses received at different times in the system of Fig. 4 than in the systems disclosed in Figs. 1 and 3.

Figure 5:
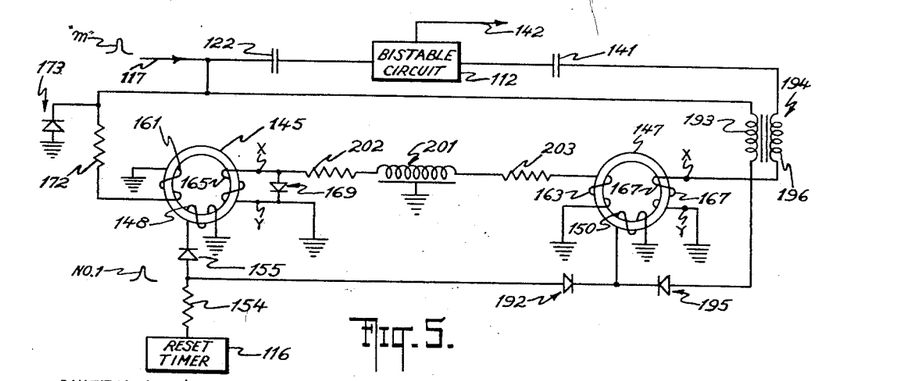
Fig. 5 is a schematic diagram of yet another embodiment of the present invention.

Another embodiment of the present invention is illustrated in Fig. 5. This embodiment is similar to that of Fig. 3 except that a delay line 201 is substituted for the middle core 46′ and its windings and no shift No. 2 pulses are required for the system of Fig. 5. A component of the system of Fig. 5 designated by a 3-digit reference numeral whose first digit is "1" and whose second and third digits correspond to a reference numeral for a corresponding Fig. 3 component is similar in structure and function to such a corresponding component in Fig. 3.

The delay line 201 may be similar to any artificial transmission line network known in the art for delaying a pulse supplied thereto by an amount which is a function of the number of sections comprising the artificial line. Series resistors 202 and 203 connected to input and output terminals of the delay line, respectively, are provided for impedance matching purposes. The input resistor 202 is connected to the terminal X of output winding 165 about core 145 and the output resistor 203 is connected to the upper end of the input winding 163 for core 147.

The bistable circuit 112 of Fig. 5 is of the multi-vibrator type shown in Fig. 3 having the normally cut-off tube thereof coupled to input capacitor 122 and the normally conductive tube thereof coupled to the input capacitor 141. A normal condition for such a tube is considered as that condition in which a tube is operated before receipt of any trigger pulses.

The reset timer 116 again provides recurrent pulses of current through the shift pulse input windings 148 and 150 for magnetically saturating cores 145 and 147 in a counterclockwise direction, for example. Saturation of a core in a counterclockwise direction again means that it is in an inactive state while saturation in an opposite (clockwise) direction means that a core is in an active state.

Figure 5A:
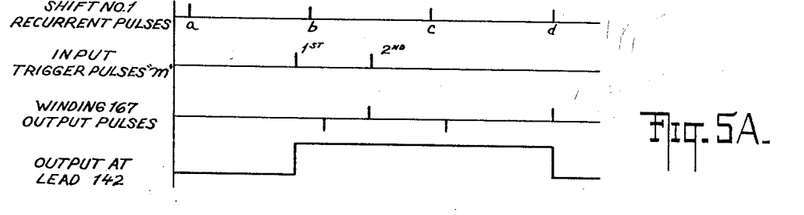
Fig. 5A is a plot of various voltage waveforms versus time provided in the system of Fig. 5.

A first positive input trigger pulse "m" as shown in Fig. 5A causes the normally cut-off tube of circuit 112 to be turned on and the normally conductive tube to be cut off. The plate voltage of the normally conductive tube, that is, the tube which is normally conducting before any trigger pulses are received, appears on lead 142 and is plotted in Fig. 5A against time as are the shift No. 1 recurrent pulses from the reset timer 116, the input trigger pulses "m" and the output pulses derived from output winding 167 upon core 147.

A trigger pulse "m" causes a pulse of current to flow through the input winding 161 of core 145 so that the core becomes magnetically saturated in a clockwise direction. Thus, core 145 is changed from its inactive to its active state by the trigger pulse "m". The positive output pulse provided between terminals X and Y of output winding 165 at this time is blocked from the delay line 201 by the rectifier 169, which becomes conductive when its upper terminal is more positive than its lower. Core 147 remains magnetically saturated in a counterclockwise direction as the current pulse through winding 150 upon conduction through the rectifier 195 at this time is in a direction for counterclockwise magnetization of core 147.

A shift No. 1 pulse such as No. 1b recurring after the first trigger pulse "m" drives core 145 back into its inactive state, core 147 remaining in an inactive state. At this time, a negative output pulse is provided between terminals X and Y of winding 165 of core 145 for application to the input terminals of the artificial line 201. The line 201 delays this pulse for a sufficient length of time so that it is applied to the input winding 163 of core 147 for causing current flow therein a short time after current flows through the winding 150 as a result of a shift pulse input thereto. Thus, the negative pulse applied to winding 163 causes core 147 to become magnetically saturated in a clockwise direction, the core 147 assuming an active state of magnetization.

The negative output pulse provided between terminals X and Y of output winding 167 of core 147 when the core changes to its active state has no effect on the bistable circuit 112 as the tube thereof to which such a pulse is applied through capacitor 141 is still cut-off. Thus, the output voltage from circuit 112 remains at its peak as illustrated in Fig. 5A.

If no other trigger pulses "m" were received the next shift No. 1c pulse would drive core 147 into its inactive state, producing a positive pulse between terminals X and Y of winding 167. Such a pulse would be applied through capacitor 141 to the non-conducting tube of the bistable circuit causing it to become conductive and the other tube thereof to become non-conductive by multivibrator action. However, if a second trigger pulse "m" were received between the shift No. 1b and the shift No. 1c pulses, the core 147 would be prematurely driven into its inactive state. The effect of the positive output pulse across terminals X and Y of winding 167 at this time is cancelled in the winding 196 of transformer 194 by the voltage across winding 196 induced by the change in voltage across winding 193 as a result of the second trigger pulse "m." Thus a second trigger pulse "m" as illustrated in Fig. 5A effectively recycles the system with cores 145 and 147 being in the same states of magnetic saturation as they were when the first trigger pulse "m" was received, i. e., core 145 is in an active state and core 147 is in an inactive state.

The next shift No. 1c pulse drives core 145 into an inactive state and, a short time later the resultant negative output across winding 165 of core 145 drives core 147 into an active state. The following shift No. 1d pulse drives core 147 into an inactive state providing a positive pulse across output winding 167 thereof for transfer through capacitor 141 to the cut-off tube of the bistable circuit 192 so that it again conducts and the other tube thereof becomes cut off by multivibrator action. Thus, a simplified system requiring only two magnetic cores and one series of shift pulses is required for the system of Fig. 5 for providing substantially the same results as the system of Fig. 3.

Figure 6:
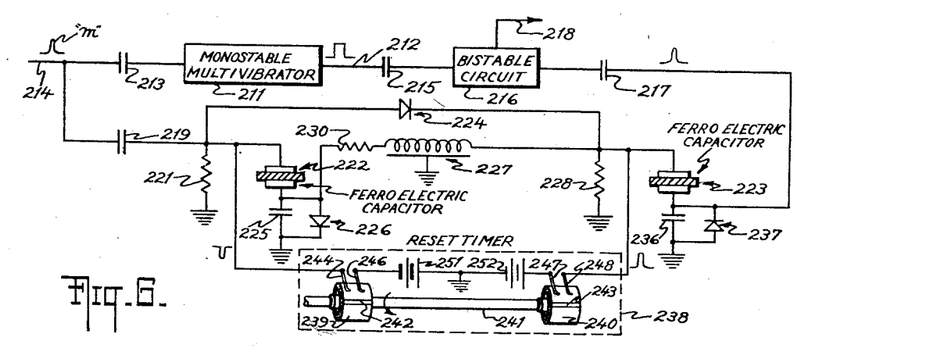
Fig. 6 is a schematic diagram of a further embodiment of the present invention utilizing ferroelectric storage devices.

A further embodiment of the present invention using ferroelectric capacitors as information storage devices is shown in Fig. 6. This system comprises a monostable multivibrator 211 adapted to provide a positive output pulse of desired width at lead 212 in response to a positive input trigger pulse supplied to multivibrator 211 through a coupling capacitor 213 and input lead 214. The output of multivibrator 211 is supplied through a capacitor 215 to the grid of a normally cut-off tube, not shown, of a bistable multivibrator circuit 216 of the type shown in Fig. 3, for example. The grid of a normally conductive tube, not shown, of the bistable circuit 216 is connected to a further coupling capacitor 217. An output lead 218 is coupled to the plate of the aforementioned normally conductive tube of the bistable circuit 216.

A coupling circuit comprising capacitor 219 and a resistor 221 having one end grounded is connected between lead 214 and the upper terminal of a ferroelectric capacitor 222. The upper terminal of capacitor 222 is also coupled through a rectifier 224 to the upper terminal of a further ferroelectric capacitor 223.

Each of the ferroelectric capacitors 222 and 223 is of a type having a ferroelectric dielectric element as the medium between condenser plates, such a capacitor being electrically polarizable in one or an opposite direction depending on the polarity of a polarizing voltage of suitable magnitude applied across the capacitor. A ferroelectric capacitor has the property of retaining its polarization even after an applied voltage is removed and a further property of providing a greatly increased capacitance for a period of time while a change is taken place from one polarized state to an opposite polarized state. It is preferable that capacitors 222 and 223 be of the type wherein dielectric induction versus applied electric field intensity curves for the ferroelectric materials thereof have substantially rectangular hysteresis loops similar to the B–H curves for ferromagnetic materials. Such capacitors are shown and described in vol. 71, pages 916–922 of Electrical Engineering published by the A. I. E. E. October 1952, for example.

The lower terminal of the ferroelectric capacitor 222 is coupled to ground through a condenser 225 having a rectifier 226 connected thereacross for passing current only in the direction of the arrow thereof. A common upper terminal for condenser 225 and rectifier 226 is coupled through an impedance matching resistor 230 to an artificial delay line 227 whose other end is connected to the upper terminal of ferroelectric capacitor 223. A coupling and impedance matching resistor 228 is also being connected between this latter terminal and ground.

The lower terminal of the ferroelectric capacitor 223 is coupled to ground through a condenser 236 across which is connected a rectifier 237 for passing current in the direction of the arrow thereof. The common upper terminal for condenser 236 and rectifier 237 is coupled to the input capacitor 217 for the bistable circuit 216.

A reset timer device 238 provided for simultaneously supplying a series of recurrent negative shift pulses to the upper terminal of ferroelectric capacitor 222 and a series of recurrent positive shift pulses to the upper terminal of ferroelectric capacitor 223. The device 238 comprises first and second non-conductive rotors 239 and 240 coupled together by a shaft 241 for synchronous rotation at a desired rate by a motor, not shown. The rotors 239 and 240 are provided with commutator strips 242 and 243, respectively, for synchronous rotation at corresponding angular positions.

Fixed metallic brushes 244 and 246 are provided in insulated relationship with each other in juxtaposition with the rotor 239 so as to be contacted by commutator strip 242 once during each revolution of rotor 239. Similarly, fixed metallic brushes 247 and 248 are provided in insulated relationship with each other in juxtaposition with the rotor 240 so as to be contacted by commutator strip 243 once during each revolution of the rotor 240 at the same time commutator strip 242 contacts brushes 244 and 246.

Brush 244 is connected to the upper terminal of ferroelectric capacitor 222, brush 246 being connected to the negative terminal of a battery 251. Brush 248 is connected to the upper terminal of ferroelectric capacitor 223, brush 247 being connected to the positive terminal of battery 252. The remaining terminals of batteries 251 and 252 are grounded. Therefore, each time the commutator strips provide a short circuit between the brushes adjacent thereto a negative voltage pulse is supplied between the upper terminal of ferroelectric capacitor 222 and ground and a positive voltage pulse is supplied between the upper terminal of ferroelectric capacitor 223 and ground. These pulses are again referred to as shift pulses, being provided for polarizing the ferroelectric capacitors in opposite directions and in what will be referred to below as inactive states of polarization. Whenever such a capacitor is repolarized in a direction opposite to that caused by a shift pulse supplied thereto, it is considered as in an active state of electric polarization.

Figure 6A:
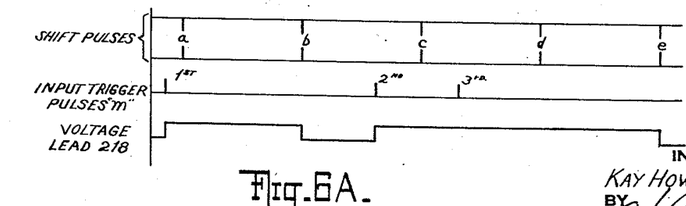
Fig. 6A is a plot of various voltage waveforms versus time for the system of Fig. 6.

In operation, a first positive trigger pulse "m" at the input lead 214 causes multivibrator 211 to generate a positive output which triggers the bistable circuit 216 for reversing the conductive properties of the tubes thereof and increasing the voltage at the output lead 218 as is indicated in the lowermost timing voltage waveform of Fig. 6A. At the same time, the positive trigger pulse from lead 214 applied to the ferroelectric capacitor 222 causes the polarization of this capacitor to be changed to an active state which is in an opposite direction than before. During a certain period while this change in polarization is taking place the capacitance of the device 222 increases to a value which is substantially larger than the capacitance of the condenser 225 so that a positive voltage pulse would ordinarily be provided across condenser 225 at the time of a positive input trigger pulse. However, the rectifier 226 becomes conductive at such a time so that condenser 225 is shorted to ground and substantially no pulse input is provided for the delay line 227. The positive trigger pulse from lead 214 applied to the ferroelectric capacitor 223 through the rectifier 224 at the time of the first trigger pulse has no effect on the polarization of capacitor 223 as it is still in an inactive state of polarization as a result of the shift pulses applied thereto of the same polarity as a trigger pulse.

A negative shift pulse "a" applied to the capacitor 222 after the first trigger pulse causes the capacitor 222 to be repolarized back into its first or inactive state. During a certain period while this change in polarization is taking place the value of the capacitance of the capacitor 222 becomes very large compared to that of condenser 225 so that most of the voltage of the negative shift pulse appears across the condenser 225 causing a pulse to be supplied to delay line 227. After a period of time determined by the constants of the delay line 227, the resultant negative pulse therefrom is supplied to the ferroelectric capacitor 223 for changing its state of polarization to an opposite direction corresponding to an active state for the capacitor 223. Any negative output pulse across the condenser 236 at this time is shorted to ground by the rectifier 237. Even if a negative pulse is provided across condenser 236 it can have no effect on the bistable circuit 216 as the tube to which output pulses from across condenser 236 are supplied is cut off at this time.

The following positive shift pulse "b" applied to the ferroelectric capacitor 223 from the reset timer 238 causes the capacitor 223 to be repolarized back in its original direction so that the capacitor 223 is driven into its inactive state of electric polarization. During a certain period while this change in polarizaton is taking place, a positive output pulse is provided across the condenser 236 and applied to the bistable circuit 216 through capacitor 217 for reversing the conduction of the tubes therein and decreasing the voltage upon the lead 218 as illustrated in Fig. 6A.

A second positive trigger pulse received after the shift pulses "b" causes the bistable circuit to be triggered and capacitor 222 to be repolarized to an active state as before. The next following negative shift pulse "c" applied to the ferroelectric capacitor 222 changes its polarization back to an inactive state, the negative pulse from condenser 225 at this time being supplied through delay line 227 to repolarize capacitor 223 into its active state. A following or third trigger pulse after the shift pulse "c" repolarizes the capacitor 222 to an active state while repolarizing capacitor 223 to its inactive state by the voltage applied thereto through rectifier 224. The positive output pulse provided across condenser 236 at this time as a result of the positive trigger pulse applied through rectifier 224 to the capacitor 223 will not change the operation of the bistable circuit 216, provided the positive output voltage from multivibrator 211 in response to a trigger pulse at lead 14 is wide enough to override the effects of a positive pulse applied to circuit 216 through capacitor 217.

At the time of the third trigger pulse, the ferroelectric capacitor 222 is driven in its active state and the ferroelectric capacitor 223 is in its inactive state. The following negative shift pulse "d" applied to the ferroelectric capacitor 222 drives this capacitor back into an inactive state of polarization whereby a negative pulse is supplied to the delay line 227. The delayed negative output pulse from the delay line 227 drives the capacitor 223 back into an active state. If no more trigger pulses are received, the following positive shift pulse "e" applied to the ferroelectric capacitor 223 drives this capacitor back into an inactive state so that a positive pulse is supplied to the bistable circuit 216 for reversing the conduction of the tubes therein so that the voltage at the lead 218 is again reduced. Thus, a system utilizing ferroelectric capacitors is provided for generating an output voltage of predetermined magnitude for a certain duration after an input trigger pulse, the system being capable of being recycled in response to a further trigger pulse for maintaining said voltage just as in the systems of Figs. 1–5 employing ferromagnetic core devices.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse timing system, comprising a bistable circuit having first and second stable states of operation, a trigger input for receiving trigger pulses of predetermined polarity, means coupled to said trigger input for response to a first trigger pulse of predetermined polarity for driving said bistable circuit into its second stable state, a low impedance time cycling system including input and output ferro-type bistable storage devices in tandem between said trigger input and said bistable circuit for providing a delayed output in response to said first trigger pulse for driving said bistable circuit back into its first stable state, and means for recycling the timing of said cycling system in response to a further trigger pulse occurring before said delayed output in response to said first trigger pulse is provided thereby.

2. A pulse timing system as set forth in claim 1, wherein each of said bistable storage devices comprises a ferroelectric capacitor for polarization in first or second opposite directions as a function of the polarity of a voltage applied thereto.

3. A pulse timing system as set forth in claim 1, wherein each of said bistable storage devices comprises a ferromagnetic reactor for saturation in first or second opposite directions as a function of the direction of a magnetic field applied thereto.

4. A pulse timing system, comprising first and second bistable ferro-type storage devices each having a first and a second stable state of opposite electrical characteristics, means for applying a series of recurrent shift pulses to each of said storage devices for operation thereof in its first stable state, a trigger input for receiving trigger pulses of predetermined polarity, first means coupling said trigger input to said first and second storage devices, said first coupling means being responsive to a trigger pulse of said predetermined polarity for changing the electrical characteristic of said first device to its second state if just previously in its first state without changing the electrical characteristic of said second device if just previously in its first state, second means coupling said first storage device to said second storage device for changing the electrical characteristic of said second device to its second state in response to a change in the electrical characteristic of said first device from its second to its first state in response to a shift pulse supplied to said first device, said second storage device being responsive to energy supplied by said first coupling means in response to a further input trigger pulse for changing the electrical characteristic of said second device back to its first state if just previously in its second state, and output means coupled to said second storage device for providing a pulse output of predetermined polarity whenever the electrical characteristics of said second storage device is changed from the second to the first state therefor in response to a shift pulse supplied to said second device.

5. A pulse timing system as set forth in claim 4, wherein each of said bistable storage devices comprises a ferroelectric capacitor adapted to be polarized in first or second opposite states.

6. A pulse timing system as set forth in claim 4, wherein each of said bistable storage devices comprises a ferromagnetic core device adapted to be saturably magnetized in first and second opposite directions.

7. A pulse timing system, comprising a trigger input for receiving trigger pulses of a first polarity, a first saturable magnetic core having a first input winding, a second input winding and an output winding, a second saturable magnetic core having a first input winding, a second input winding and an output winding, means for supplying recurrent shift pulses to each of said second input windings of said first and second cores for driving each of said cores into a first state of magnetic saturation, means coupled between said trigger input and said first input winding of said first core for supplying a pulse of current to said last-mentioned input winding in response to a trigger pulse of said first polarity at said trigger input for driving said first core into a second state of magnetic saturation opposite its first state, coupling means between the output winding of said first core and the first input winding of said second core for supplying a pulse of current to said last-mentioned input winding in response to a change in the magnetic saturation of said first core from its second to its first state for driving said second core into a second state of magnetic saturation opposite its first state, a bistable circuit having first and second stable operating states, said bistable circuit being adapted to be in its first stable operating state before receipt of a trigger pulse at said trigger input, first coupling means between said bistable circuit and said trigger input for supplying a voltage pulse of predetermined polarity to said bistable circuit in response to a trigger pulse of predetermined polarity for changing the operation of said bistable circuit into its second stable operating state, and second coupling means between said bistable circuit and said output winding of said second core for changing the operation of said bistable circuit into its first stable operating state in response to a voltage pulse output of predetermined polarity from the output winding of said second core provided when the magnetism of said second core is changed from a predetermined one to the other of its states of magnetic saturation.

8. A pulse timing system as set forth in claim 7, further including means coupled to said trigger input for providing a magnetizing force for said second core for driving said core into its first state of magnetic saturation in response to a trigger pulse of predetermined polarity at said trigger input, and means for effectively nullifying the effect upon said bistable circuit of a voltage pulse provided at the output winding of said second core when the magnetization thereof is changed from its second to a first state at the time of a trigger pulse supplied to said trigger input when said second core is in its second state of magnetic saturation.

9. A pulse timing system as set forth in claim 7, further including means coupled to said trigger input for response to a trigger pulse thereat for providing a magnetizing force for said second core for magnetization in its first state, said last-named means including a transformer winding of a one to one transformer, the other winding of said transformer comprising part of said second coupling means between the output winding of said second core and said bistable circuit.

10. A pulse timing system as set forth in claim 7, further including means coupled to said trigger input for response to a trigger pulse of predetermined polarity for providing a magnetizing force for said second core for magnetization in its first state, said first coupling means between said bistable circuit and said trigger input including a monostable circuit for providing an output voltage pulse of a predetermined duration in response to an input trigger pulse of predetermined polarity, said duration being longer than the duration of any voltage pulse provided at the output winding of said second core in response to a change in a state of magnetic saturation for said second core.

11. A pulse timing system, comprising trigger input means, a monostable circuit coupled to said trigger input means for providing an output pulse of predetermined polarity and duration in response to a trigger pulse input of predetermnied polarity, a bistable circuit coupled to the output of said monostable circuit for response to said output pulse of said predetermined polarity for operation in one of two stable operating states therefor, a first saturable magnetic core having a first input winding, a second input winding and an output winding, a second saturable magnetic core having a first input winding, a second input winding and an output winding, means for supplying recurrent shift pulses to each of said second input windings of said first and second cores for driving each of said cores into a first state of magnetic saturation, means coupled to the first input winding of said first core for supplying a voltage pulse thereto in response to a trigger input pulse for driving said first core into a second state of magnetic saturation opposite its first state, means for magnetizing said second core into its first state of magnetization upon receipt of a trigger input pulse, means between the output winding of said first core and the first input winding of said second core for supplying a pulse of current thereto in response to a change in the magnetic saturation of said first core from its second to its first state for driving said second core into a second state of magnetic saturation opposite its first state, and output means coupled between said bistable circuit and the output winding of said second core for receiving an output pulse provided in response to a change in the magnetic saturation of said second core back to its first state for driving said bistable circuit into the other of its two stable operating states, said monostable circuit comprising means for providing an output pulse of greater duration than that provided at the output winding of said second core.

12. A pulse timing system, comprising trigger pulse input means, a plurality of similar saturable magnetic cores, first and second of said cores each having a first input winding disposed thereabout for passing recurrent shift pulses of current for magnetically saturating each of said first and second cores in a first direction, means coupled to said trigger pulse input means for saturably magnetizing said first core in a second direction opposite the first direction therefor while saturably magnetizing said second core in the same direction as the first direction therefor in response to a received trigger pulse, an output winding disposed about said first core for providing a voltage pulse in response to a change in the magnetic saturation of said first core, a further input winding disposed about said second core, coupling means between said output winding of said first core and said further input winding of said second core for supplying a delayed pulse to said further input winding for changing the magnetic saturation of said second core to a second and opposite direction in response to a voltage pulse provided at output winding of said first core as a result of a change in the magnetic saturation of said first core from its second to its first direction, and an output winding for said second core for providing a voltage output in response to a change in the magnetic saturation of said second core.

13. A pulse timing system as set forth in claim 12, further including a bistable circuit having first and second stable operating states, means coupling said bistable circuit to said trigger pulse input means for triggering of said circuit into a first operating state upon receipt of an input trigger pulse, and further means coupling said bistable circuit to the output winding of said second magnetic core for triggering of said circuit into a second operating state.

14. A pulse timing system as set forth in claim 13, further including a transformer having a pair of similar one to one transformer windings, one of said transformer windings being connected between said bistable circuit and an end of the output winding of said second magnetic core, the ends of the other of said transformer windings being coupled between said trigger input means and the means for saturably magnetizing said second core in response to a received trigger pulse.

15. A pulse timing system, comprising a saturable magnetic core arrangement including an input storage core, an output storage core and at least one storage core in intermediate electrical relationship between said input and output storage cores, each of said cores having first input and output windings, a second input winding upon each core for receiving a series of recurrent pulses, each of said cores being adapted to be magnetically saturated in a first state and predetermined direction by said recurrent pulses supplied to the second input winding therefor, the magnetic saturation for each core being adapted to be changed from a first to a second state and then back to a first state in sequence from one core to the next in response to an input trigger pulse received by the timing system, the delay between the time said input trigger pulse is received and the time the magnetization of said output core is changed from a second to a first state being a function of the repetition rate of said recurrent pulses and the number of magnetic cores in said arrangement, a bistable circuit adapted to be normally maintained in one of two different stable operating states, means coupled to said bistable circuit and responsive to said input trigger pulse for changing said bistable circuit to the other of its different stable operating states, further coupling means between said bistable circuit and an output winding of the output storage core of said core arrangement and responsive to an output pulse of predetermined polarity provided by said timing system in the absence of a further trigger pulse for changing said bistable circuit back to said one of its stable operating states, and means for causing a further trigger pulse received after said first mentioned trigger pulse and before the change of said bistable circuit back to its one operating state to recycle the magnetic states of said cores without changing the operating state of said bistable circuit.

References Cited in the file of this patent
UNITED STATES PATENTS

| | | |
|---|---|---|
| 2,652,501 | Wilson | Sep. 15, 1953 |
| 2,691,154 | Rajchman | Oct. 5, 1954 |